April 22, 1924.
A. G. BERNAT
BRUSH
Filed May 21, 1923
1,491,459
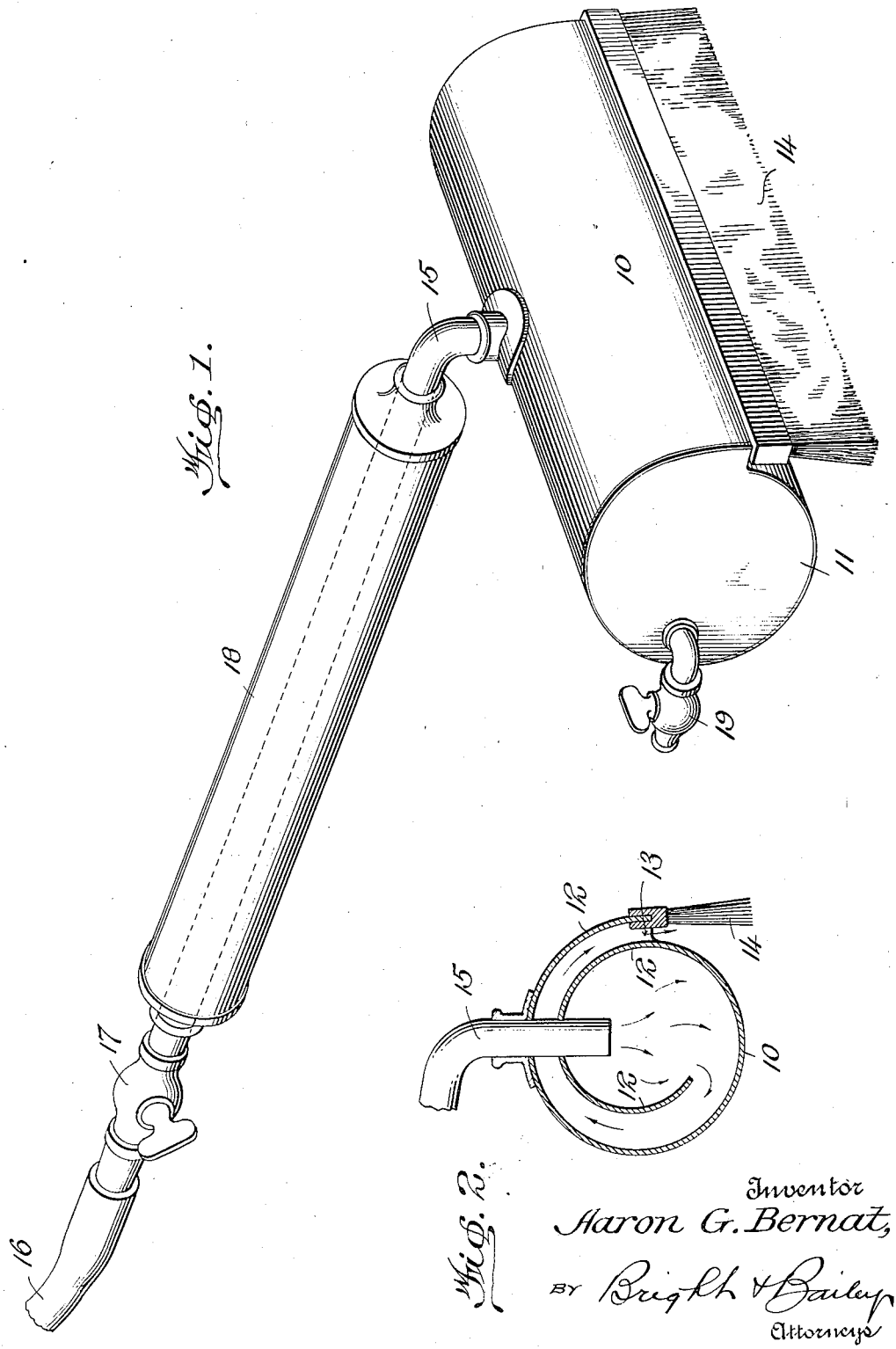

Patented Apr. 22, 1924.

1,491,459

UNITED STATES PATENT OFFICE.

AARON G. BERNAT, OF SAN DIEGO, CALIFORNIA.

BRUSH.

Application filed May 21, 1923. Serial No. 640,498.

*To all whom it may concern:*

Be it known that I, AARON G. BERNAT, a citizen of the United States, and resident of San Diego, in the county of San Diego and State of California, have invented certain new and useful Improvements in Brushes, of which the following is a specification.

My invention relates to improvements in brushes for cleaning, renovating and freshening cloth of various kinds, and for raising the nap of velvet, plush, velour etc., to which end it includes means for supplying steam to the material to be cleaned as set forth in my copending application, Serial Number 514,732.

In my aforesaid application I disclosed a brush including means for supplying numerous individual jets of steam to the material to be cleaned, but I have since discovered that this arrangement can be improved and better results obtained with less labor by supplying steam to the material in a thin, continuous stream or sheet rather than in individual jets, and therefore it is my present aim to produce a brush that will accomplish the latter result and that will also accomplish the purpose of preventing condensate water from reaching the material, so that only dry steam will be supplied thereto.

With the foregoing and other purposes in view, my invention consists in the novel features of construction, combination and arrangement of parts as will be hereinafter more fully described, illustrated in the accompanying drawings and particularly defined in the appended claims.

In the drawings, wherein like characters of reference denote corresponding parts in the different views—

Figure 1 is a perspective of a brush embodying the novel and essential features of my invention; and Figure 2, a transverse section therethrough.

Referring now to the drawings in detail, 10 designates an elongated steam chamber that is formed from a single piece of sheet material rolled upon itself in the form of a spiral and that is closed at its ends as at 11, the convolutions 12 of said spiral being relatively spaced as shown. Accordingly, between the terminal end portion of the outermost convolution 12 and the outer face of the adjacent inner convolution a passage 13 is provided, which passage extends the full length of the chamber 10 and communicates with the interior of the chamber through the space between the convolutions 12 as is manifest. The width of passage 13 is determined by the spacement between the convolutions 12 during construction of the chamber 10, but preferably said passage is relatively narrow, so that steam supplied to the interior of the chamber will issue through said passage in a thin sheet.

Secured in any suitable manner to the chamber 10 adjacent to the passage 13, preferably upon the terminal of the outermost convolution 12, so that steam issuing from said passage will be directed thereagainst, is a brush 14 which brush extends the full length of the chamber as shown.

For supplying steam to the chamber 10 I form alined openings through the convolutions 12 and extend through said openings a tube 15 one end of which I terminate within the innermost convolution 12 as shown. The other end of said tube I provide with any suitable means whereby it may be attached to a hose 16 for conveying steam from a suitable source to the brush, and in said tube I locate a valve 17 for controlling the flow of the steam. The tube 15 is rigidly secured with respect to the chamber 10 in any preferred manner and is used to manipulate the brush, to which end it is provided with a handle or insulating hand grip 18.

From the foregoing description considered in connection with the drawing, it is believed that the construction, operation and advantages of my improved brush will be apparent. The hose 16 is connected with a suitable source of steam supply and the valve 17 adjusted to secure a desired flow of steam to the chamber 10. Steam entering the chamber 10 traverses the space between the convolutions 12 and issues through the passage 13 in a thin, continuous sheet onto the brush 14 and the material being cleaned as is obvious. Owing to the tortuous path followed by the steam in its travel from the interior of the chamber to the passage 13, water resulting from condensation of the steam is prevented from reaching the brush and the material being cleaned and is collected on the bottom of the chamber 10, from where it may be drawn off through a suitable valve 19 in one end of the casing as is manifest.

I claim:—

1. A device of the class described comprising a steam chamber formed from a single piece of sheet material rolled in the form of a spiral having spaced convolutions providing an exit passage between adjacent convolutions and a tortuous passage between the interior of the chamber and said exit passage, means for supply steam within the innermost convolution of said chamber, and a brush mounted adjacent to said exit passage.

2. A device of the class described comprising a steam chamber formed from a single piece of sheet material rolled upon itself in the form of a spiral having spaced convolutions providing an exit passage between the terminal portion of the outermost convolution and the adjacent inner convolution, means for supplying steam within said chamber, and a brush mounted on the terminal end of said outermost convolution.

3. A device of the class described comprising a steam chamber formed from a single piece of sheet material rolled upon tself in the form of a spiral having spaced convolutions providing an exit passage between the terminal portion of the outer convolution and the adjacent inner convolution, a steam supply tube extending through all of the convolutions and terminating within the innermost convolution, and a brush mounted on said chamber adjacent to said exit passage.

In testimony whereof I hereunto affix my signature.

AARON G. BERNAT.